(12) United States Patent
Townsend et al.

(10) Patent No.: US 7,356,828 B2
(45) Date of Patent: Apr. 8, 2008

(54) RECEIVERS FOR TELEVISION SIGNALS

(75) Inventors: Christopher Townsend, Isleworth (GB); David Holliday, Isleworth (GB); Robin Crossley, Isleworth (GB); Alun David Webber, Isleworth (GB)

(73) Assignee: British Sky Broadcasting Limited, Middlesex (GB)

( * ) Notice: Subject to any disclaimer, the term of this patent is extended or adjusted under 35 U.S.C. 154(b) by 663 days.

(21) Appl. No.: 10/685,582

(22) Filed: Oct. 16, 2003

(65) Prior Publication Data

US 2004/0080673 A1 Apr. 29, 2004

Related U.S. Application Data

(60) Continuation of application No. 10/013,683, filed on Dec. 13, 2001, now abandoned, which is a division of application No. 08/952,603, filed as application No. PCT/GB96/01228 on May 22, 1996, now Pat. No. 6,501,514.

(30) Foreign Application Priority Data

May 22, 1995 (GB) .................................. 9510429.5
Sep. 27, 1995 (GB) .................................. 9519651.5

(51) Int. Cl.
*H04N 5/445* (2006.01)
*H04N 5/60* (2006.01)
(52) U.S. Cl. ........................... 725/39; 725/41; 348/734
(58) Field of Classification Search ................ 348/552, 348/553, 563–565, 725, 460, 734; 725/39–59
See application file for complete search history.

(56) References Cited

U.S. PATENT DOCUMENTS 4,527,204 A 7/1985 Kozakai et al.

(Continued)

FOREIGN PATENT DOCUMENTS

DE 2744057 A1 4/1979
EP 0 263 555 4/1988

(Continued)

OTHER PUBLICATIONS

Funkschau No. 2/95, Spracherkennung, "Alles aus einer Hand", Jan. 5, 1995, pp. 1-6 (with English language translation).

*Primary Examiner*—Victor R. Kostak
(74) *Attorney, Agent, or Firm*—Rothwell, Figg, Ernst & Manbeck p.c.

(57) ABSTRACT

A receiver for television signals is arranged to receive video signals comprising video data and information data. The receiver is arranged to respond to viewer operation of a control device (28). The receiver includes a processor (23) for processing selected information data to convert the same into signals representative thereof for output to a television in combination with the video signals. In one mode of operation the decoder responds to manipulation of the control device by causing brief scheduling information pertaining to programmes transmitted in the received signal to be displayed. In another mode of operation the receiver is arranged to display detailed scheduling information pertaining to plural different television signals. The receiver is operable to receive signals containing video data representing a plurality of video clips. The processor is arranged to process the signals and to cause simultaneous display of the clips on a television screen. The processor is arranged to respond to user manipulation of the control device by storing data for subsequent viewing of user selected programmes. The decoder may further comprise a modem (32) and a CD-ROM drive (25a).

21 Claims, 9 Drawing Sheets

| U.S. PATENT DOCUMENTS | | |
|---|---|---|
| 4,706,121 A | 11/1987 | Young |
| 4,751,578 A | 6/1988 | Reiter et al. |
| 4,825,200 A | 4/1989 | Evans et al. |
| 5,128,667 A | 7/1992 | Enomoto et al. |
| 5,151,789 A * | 9/1992 | Young .................. 725/133 |
| 5,353,121 A | 10/1994 | Young et al. |
| 5,410,326 A | 4/1995 | Goldstein |
| 5,473,609 A | 12/1995 | Chaney |
| 5,523,796 A | 6/1996 | Marshall et al. |
| 5,907,323 A | 5/1999 | Lawler et al. |

| FOREIGN PATENT DOCUMENTS | | |
|---|---|---|
| EP | 0 507 314 A1 | 10/1992 |
| GB | 2053539 B | 2/1981 |
| JP | 63 300695 | 12/1988 |
| WO | WO 90/13206 A1 | 11/1990 |
| WO | WO 91/07050 A1 | 5/1991 |
| WO | WO 92/04801 A1 | 3/1992 |
| WO | WO 94/14282 A1 | 6/1994 |
| WO | WO 95/01059 A | 1/1995 |

* cited by examiner

RECEIVERS FOR TELEVISION SIGNALS

CROSS-REFERENCE TO RELATED APPLICATIONS

The present application is a continuation application of U.S. patent application Ser. No. 10/013,683, filed 13 Dec. 2001, now abandoned, which is a divisional application of U.S. patent application Ser. No. 08/952,603, filed 23 Apr. 1999, now U.S Pat. No. 6,501,514, which is a national stage filing under 35 U.S.C. §371 of international application No. PCT/GB96/01228, filed 22 May 1996, and claims priority under 35 U.S.C. §119 to Great Britain patent application No. 9519651.5 filed 27 Sept. 1995 and Great Britain patent application No. 9510429.5 filed 22 May 1995.

The invention relates to improvements in receivers for television signals.

BACKGROUND OF THE INVENTION

Originally a television (TV) in a typical home comprised a single unit connectable to an antenna to receive UHF signals broadcast terrestrially in different channels each containing a single television programme from a respective television station. More recent advances in technology have meant that additional equipment, such as video cassette recorders (VCRs) and satellite/cable receiver/decoders (decoders) have become affordable and more widely used. A VCR enables the recording of broadcasts and the playback of previously recorded cassettes. A decoder enables the reception of additional television programmes broadcast in a relatively large number of channels in media using cable or satellite-based technology. Thus, a television system comprising a TV, a VCR and a decoder, enables a user to select for viewing or recording a wide range of terrestrial and satellite/cable programmes and to play back previously recorded programmes. Such a system therefore enables the user to select a programme for viewing from multiple different media.

As the size of a television system is increased by the addition of extra equipment, control and operation of the system becomes more complex. The VCR and the decoder can be linked to the TV via its UHF input by tuning the TV to receive UHF signals from the VCR in one channel and to receive UHF signals from the decoder in another channel. For this to operate satisfactorily, the VCR and the decoder must each be tuned to output signals in different channels than each other and in channels not used by terrestrial stations. The VCR and the decoder each contain a modulating circuit for placing the signals onto a UHF carrier so that the signals can be demodulated by the receiver within the TV. Such modulation and demodulation is undesirable because it results in some degradation (albeit generally undetectable by the viewer) in the programme from the VCR or decoder.

These problems can to some extent be avoided by the use of so-called SCART connectors between the TV, the VCR and the decoder. The SCART system avoids the unnecessary use of UHF carriers by providing a direct path between the VCR, the decoder and the TV. The SCART system includes control lines that enable the VCR to override signals from the TV receiver, thereby causing the programme from the VCR to be displayed on the TV screen, and similarly enable the decoder to override signals from both the TV receiver and the VCR so that the programme from the decoder is displayed on the TV screen. The use of SCART connectors thus simplifies connection between, and selection of, the TV, the VCR and the decoder.

However, the SCART system does not overcome the problem of user-friendly control and use of the system. Separate controls (usually in the form of remote handsets) are provided for each of the TV, the VCR and the decoder. Recording a satellite/cable programme on the VCR requires the user to programme the VCR at the required time and to programme the decoder to switch on to the required satellite/cable programme at the required time. While this is not difficult for viewers possessed of the appropriate skills, it is too much for a large number of viewers who find such technology bewildering.

At present most broadcasting, regardless of media, is analog based and comprises a single television service (e.g. SKY ONE, SKY SPORTS, SKY MOVIES) transmitted on a carrier signal or channel. However, the use of digital based broadcast technology is imminent. Digital broadcast technology will enable television service companies to transmit in a single channel high definition television programmes, or plural programmes at conventional definition or multiple customer services, or a combination of these.

In a conventional analogue-based television broadcast system programmes (or "services") are broadcast by separate television service companies on a single carrier signal ("channel"). In a digital based broadcast system it is possible to broadcast plural services multiplexed together on a single carrier. Unless the context requires otherwise the term "channel" will be used herein to refer to the bandwidth used by a single service to broadcast television programmes or other customer services. The term "channel" therefore encompasses both an entire carrier signal (when the signal is used entirely by a single service) and a portion of a carrier signal (when the signal is shared by plural services).

The ability to transmit multiple channels in a single carrier signal enables a far greater number of services to be provided in the digital domain than is possible in the analogue domain. Some of the channels in a carrier may be used to provide conventional television programmes while simultaneously other channels in the carrier are used to provide data for other customer services such as television programme listings, on-line programme ordering or so-called pay-per-view (PPV) services, and so on. Customer services should not be confused with the "services" provided by television companies as discussed hereinabove.

Clearly, as digital broadcasting technology is adopted by the station, the above-discussed problems will increase.

The invention aims to provide a greater degree of integration within a television system.

The invention also aims to simplify user control over a television system. In an embodiment of the invention to be described in greater detail hereinbelow, this simplification is achieved by making the control more user friendly by making it more intuitive.

In one aspect the invention provides a remote control device for controlling a television system including a plurality of independently controllable units, the device comprising plural user selectable keys and being arranged to response to user selection of a key by transmitting separate command signals to each of the independently controllable units to cause the television systems to be configured in a first mode and thereafter responding to further user selection of the keys by transmitting command signals pertinent to the first mode of the television system.

In another aspect the invention provides a receiver for receiving digital television signals transmitted in a plurality of channels each comprising video data and information data the receiver comprising: a decoder circuit operable on one selected channel for separating in the one channel the information data and the video data and converting the video data into signals for output for a television; a store for storing information data; a viewer operable control device; and a processor connected to receive the information data from the decoder circuit and/or the store, the processor being arranged to respond to viewer operation of the control device by processing selected information data to convert the same into signals representative thereof for output for a television in combination with the video signals.

In a further aspect the invention provides a receiver for receiving television signals in a plurality of channels, each signal comprising video data defining a television programme and programme scheduling data defining the scheduling of programmes in the plurality of channels as scheduling events, the receiver being arranged to produce from a received television signal output signals defining an image of the television programme and an image of scheduling events for display on a television screen, the receiver comprising a user operable selector operable to select for display a schedule of events for one channel while displaying a television programme in another channel or to select for display a television programme in one channel while displaying a schedule of events for the one channel or another channel.

In another aspect the invention provides a receiver for receiving television signals defining television programmes in a plurality of channels, the receiver being arranged to produce output signals defining a plurality of video clips representing television programs available in the plural signal channels which output signals are output for display of the clips in respective areas on a television screen, the receiver comprising a user operable selector operable to select one of the displayed clips and responding to such user selection by storing data to cause the receiver to receive the television signals when the programme is transmitted in the corresponding channel for display of the programme on a television screen.

In a further aspect the invention provides a receiver for receiving television signals in a plurality of channels each defining a television programme and at least a signal in one of the channels further comprising programme scheduling data defining events in terms of channels, programmes and broadcast times, the receiver being arranged to produce output signals defining an image of events in the programme schedule for displaying on a television screen, the receiver comprising a user operable selector operable to select events identified in the displayed programme schedule and responding to such user selection by storing data to cause the receiver to receive television signals defining the programmes in the channels and at the times corresponding to the selected events.

In another aspect the invention provides a receiver for receiving a television signal comprising video data defining a video picture and information data defining information relating to user selectable services, the receiver being arranged to produce output signals defining an image representing available services for display on a television screen, the receiver comprising a user operable selector operable to select a displayed service and a modem responsive to such user selection for establishing a connection via a telephone line to a provider of the selected service.

In a further aspect the invention provides a receiver for receiving a television signal comprising video data defining a video picture and message data defining messages or information to be received by a destination specified by an identity code, the receiver being arranged to produce output signals defining the video picture for display on a television screen, the receiver having a unique identity code and being arranged to respond to reception of message data having an identity code corresponding to the unique identity code by producing output signals representing the message or information in the message data for display on a television screen.

The above and further features of the invention are set forth with particularity in the appended claims and together with advantages thereof will become clearer from consideration of the following detailed description of an exemplary embodiment of the invention given with reference to the accompanying drawings.

DETAILED DESCRIPTION OF AN
EMBODIMENT OF THE INVENTION

System Overview

Figure 1:
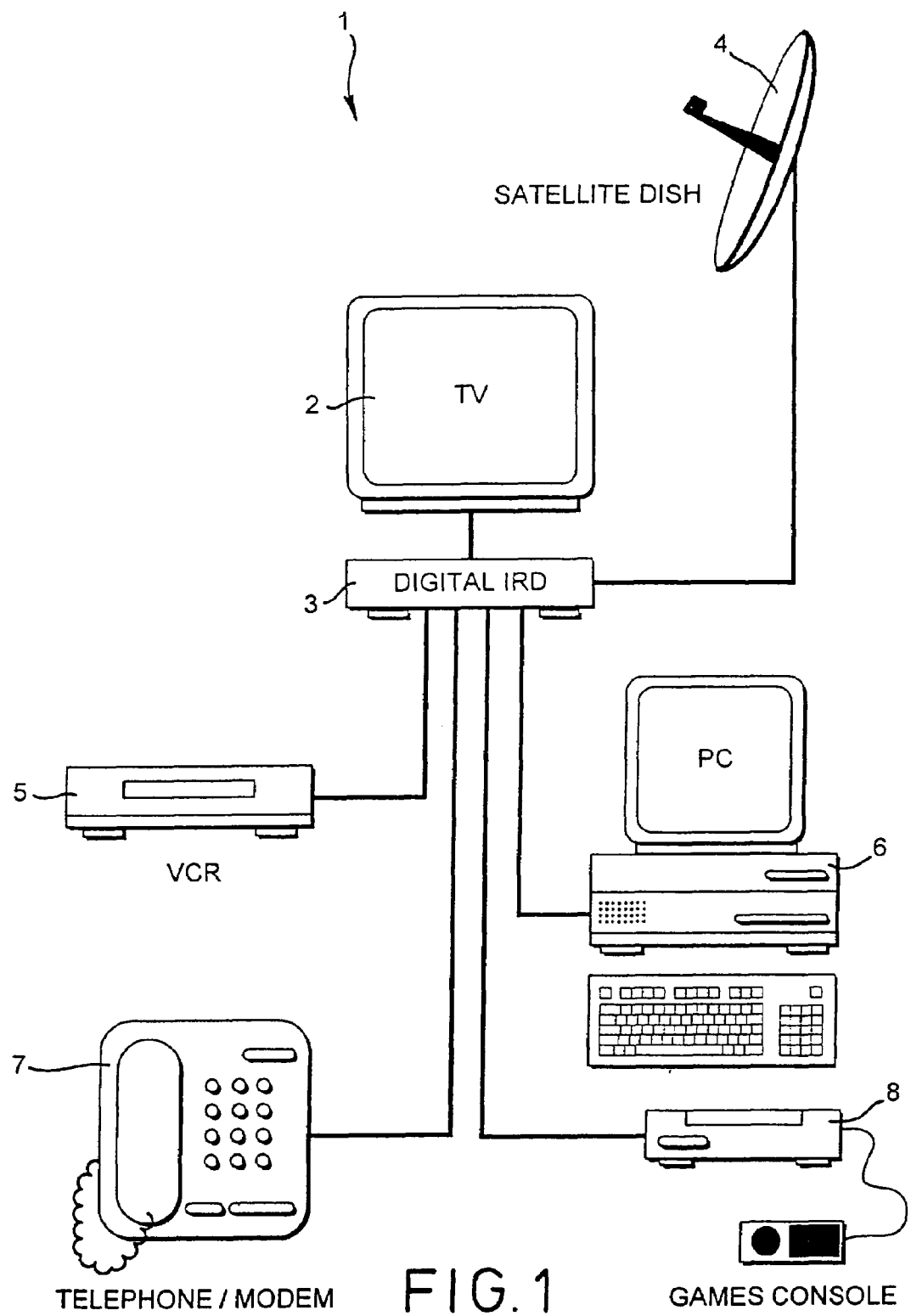
FIG. 1 is a schematic diagram of a television receiver system.

Referring now to FIG. 1 of the accompanying drawings a television receiver system 1 comprises a television (TV), a digital integrated receiver decoder 3 (decoder) connected to receive signals from a satellite dish antenna 4, and a video cassette recorder 5 (VCR). The system 1 optionally further comprises a personal computer 6 (PC) a telephone/modem 7 and a games console 8 each connected via respective lines to the decoder 3. SCART connectors or other standard connectors may be used as appropriate. The decoder 3 acts as an interface between the TV 2 and the VCR 5, PC 6, modem 7 and games console 8 and thus serves to control the system 1.

Figure 2:
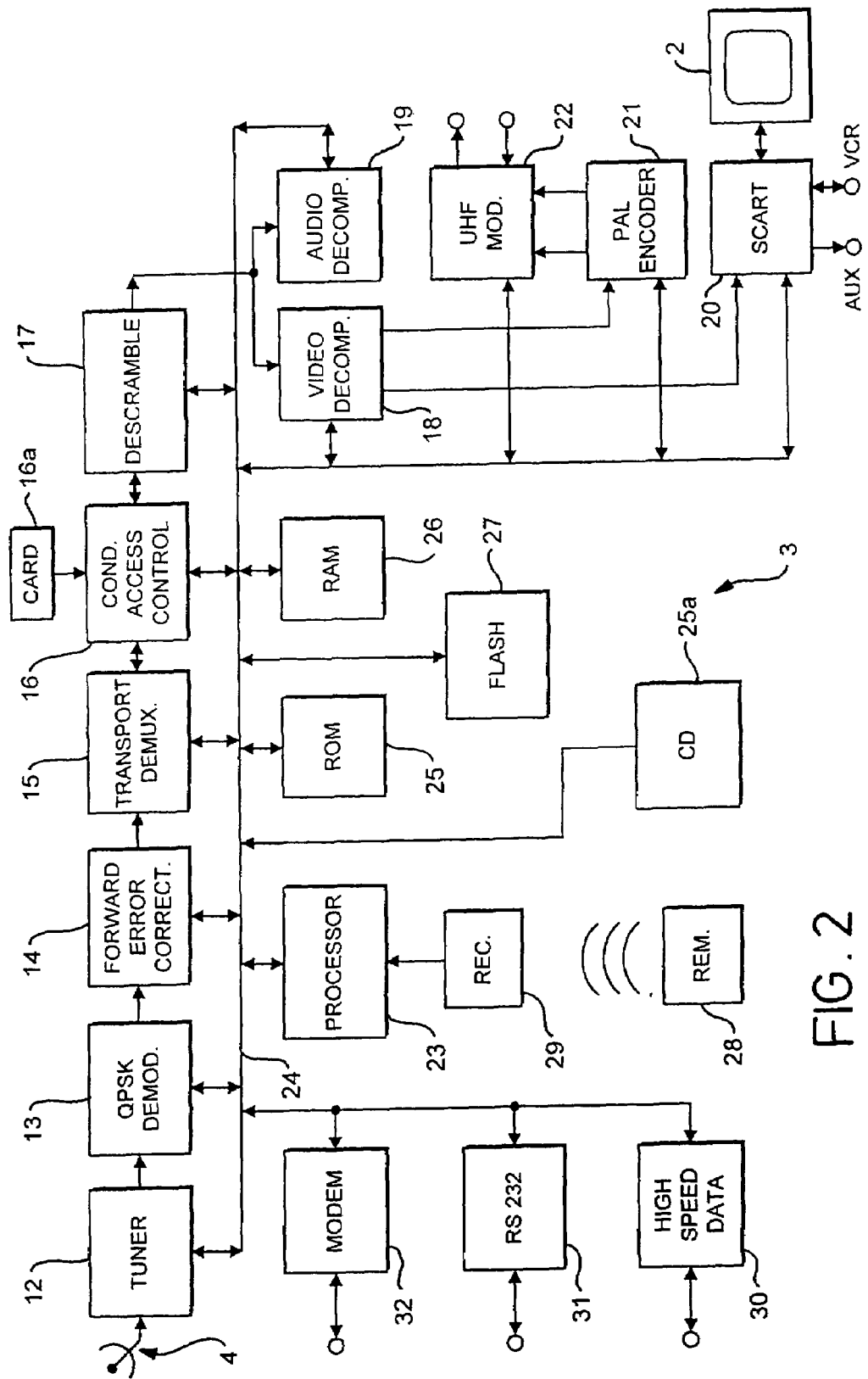
FIG. 2 is a functional block diagram of a satellite decoder.

FIG. 2 of the accompanying drawings shows the decoder 3 in greater detail. The dish antenna receives signals from a satellite (not shown).

Signals from the dish antenna 4 are input to a tuner 12 and from there to a quadrature phase shift key (QPSK) demodulator 13. Demodulated signals are error corrected by way of a forward error corrector circuit 14. Data from the forward error corrector circuit is supplied to a transport/demultiplexer 15 which separates the data into video data, audio data, user services data, programme scheduling data, etc. for distribution to various locations within the decoder. Satellite (and indeed cable) programmes are usually scrambled to prevent unauthorised access by non-authorised subscribers. The decoder 3 therefore comprises a conditional access control circuit 16 which cooperates with a smart card 16*a* to determine whether the viewer has subscribed to a particular channel and is therefore authorised to access the channel. Parental control over channel access is also provided, at least in part, by the access control circuit 16. The decoder 3 further comprises a descrambling circuit 17 which is controlled by the access control circuit 16 to enable the descrambling of the signal by authorised subscribers.

The received signals comprise digitally encoded data. It is envisaged that the data will be compressed using for example the MPEG 2 standard which permits both programme data and additional data (for example customer service data) to be transmitted in a single channel. MPEG 2 enables high compression ratios to be achieved.

Descrambled signals from the descrambling circuit 17 are input to a video decompression and processing circuit 18 and an audio decompression and processing circuit 19, operating according to the MPEG standard for example. Decompressed video signals are input to a SCART interface 20 for direct input to the TV 2 and to a PAL encoder 21 where they are encoded into the PAL format for modulation by a UHF modulator 22 for output to the UHF input of the TV if so desired.

The system 3 is controlled by a processor 23 which communicates with the various units of the system via a bus 24. The processor 23 has associated with it ROM 25 (optionally including a CD-ROM drive 25*a*), RAM 26 (comprising both dynamic RAM and static RAM) and a flash (non-volatile and writable) memory 27. As will be explained in greater detail hereinafter the processor 23 controls operation of the decoder 3 by controlling the tuner 12 to receive signals for the desired channel from the dish antenna 4 and to control demultiplexing, descrambling and decompression so that the desired programme and/or customer service data is displayed on the screen of the TV 2. Viewer selection of desired programmes and customer services is controlled by way of a remote control unit 28 which in response to viewer manipulation thereof transmits control signals to a receiver 29 for input to the processor 23.

The system 3 further comprises a high-speed data interface 30 and an RS232 interface 31 providing a serial link. The high-speed data interface 30 and the RS232 interface may be connected to the PC 6 and/or the games console 8 of FIG. 1. The decoder 3 further comprises a modem interface 32 for connecting to the telephone/modem 7 of FIG. 1.

Figure 3:
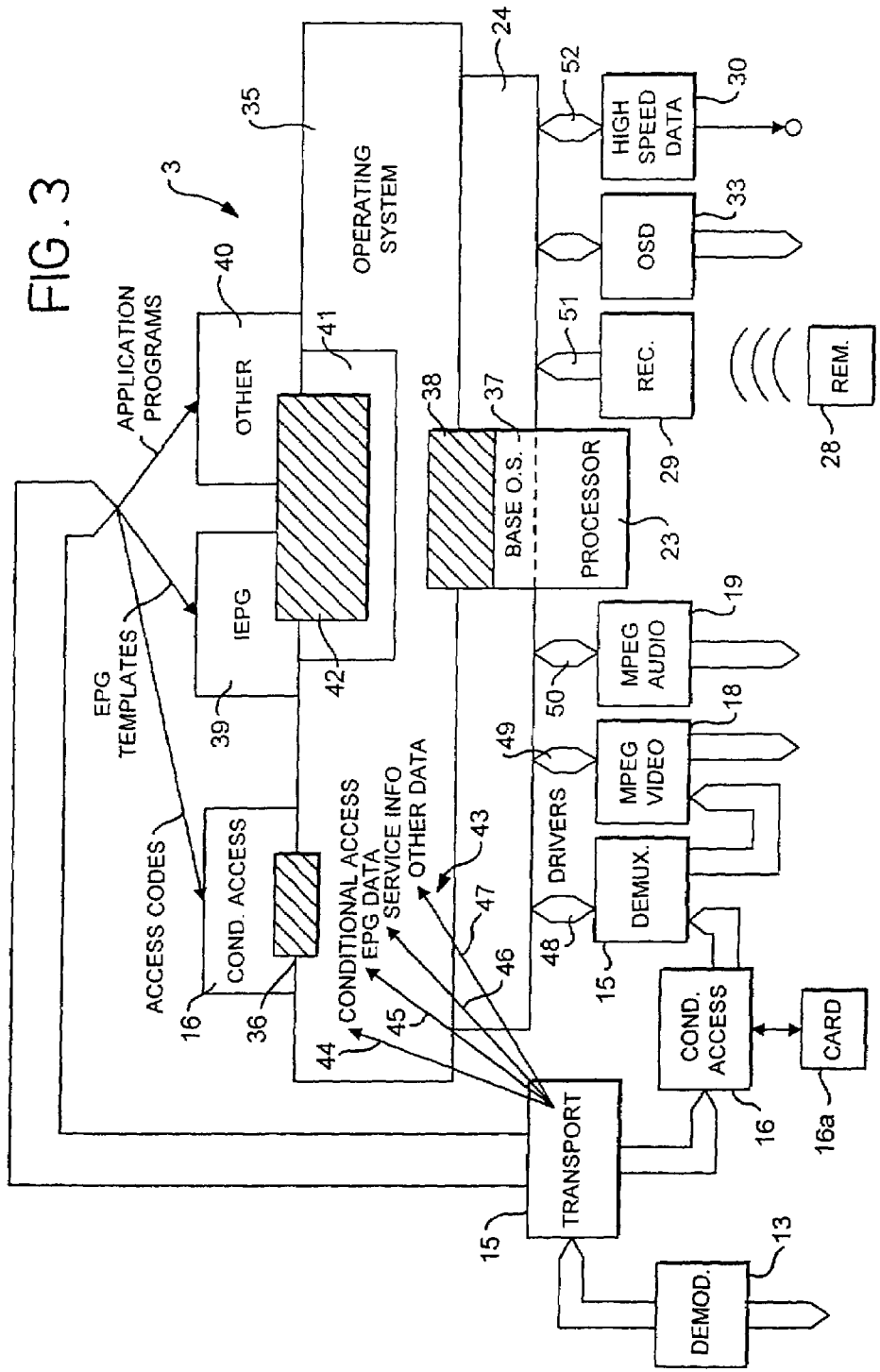
FIG. 3 is a functional diagram showing interaction between hardware and software of the decoder of FIG. 2.

Operation of the decoder 3, especially the processor 23, is controlled by software that makes the processor 23 responsive to control signals from the remote control unit 28 and to data included in the signal received by the dish antenna 4 and in the memory units 25 to 27. A schematic representation of the interaction between hardware and software in the decoder 3 is shown in FIG. 3 of the accompanying drawings. The data in an incoming signal is separated by the transporter 15 into video data and information data. The information data is distributed around the hardware and software, as will be described in greater detail hereinafter. The video data and the audio data is demultiplexed and output in suitable form for supply to a TV by the MPEG video and audio circuits 18 and 19. When information is to be displayed either with or instead of the video, data representing the information is output in suitable form for supply to the TV via an on-screen driver 33 and the video circuit 18. Signals from the OSD driver 33 and the video circuit 18 are combined as appropriate before being supplied to the TV.

Operation of the software and hardware of the decoder 3 is based around an operating system 35. The conditional access controller 16 has associated software which interfaces with the operating system via an application translator 36. The processor 23 has its own base operating system 37 which interfaces to the decoder operating system 35 via an application translator 38. Applications such as an intelligent electronic programming guide (IEPG) 39 and other applications 40 interface to the operating system 35 via an applications interface 41 and associated application translator 42.

The software for applications such as the conditional access 16 and the intelligent electronic programming guide 39 are installed permanently within non-volatile memory, e.g. the ROM 25, of the decoder 3, but variable information such as new access codes and TV programme scheduling details is updated regularly via signals received from the dish antenna 4. Demodulated signals from the demodulator 13 are input to the transport portion of the transport demultiplexer 15 which examines the data to decide where it should be sent. From time to time significant changes may be made to conditional access codes or to the manner in which the intelligent electronic programme guide (IEPG) 39 displays programme information. Also, programmes for new applications, say a new banking service for example, may be supplied via the satellite for the decoder. Such data is routed by the transporter 15 directly to the conditional access controller 16, the IEPG 39 and areas of the store for other applications 40.

Operating data 43 is supplied on a substantially continuous basis in every channel. The operating data 43 includes conditional access data 44 associated with a channel and/or programmes therein which enables the conditional access controller 16 to determine whether or not access should be allowed to a particular programme by descrambling the data therefor. Additionally, operating data relating to customer services is transmitted in dedicated channels which will be referred to herein as IEPG channels because they carry control and information data for use by the IEPG provided by the hardware and software of the processor 23 and the associated memory devices 25 to 27. Thus, the operating data 43 depicted in FIG. 3 also includes IEPG data 45 relating to specific programmes and the times at which those programmes will be broadcast, and service information 46 (for example relating to personal banking services) and indeed any other data 47 required on a substantially continuous or regular basis for the aforementioned customer services.

The transporter 15 is arranged to supply the operating data 43 to the processor 23 via the operating system 35. The processor 23 responds to the data by sending appropriate commands or information to other units within the system. Control data is also transferred between the processor 23 and such units as the demultiplexer 15, the video and audio decompressors 18, 19, the remote control receiver 29 and the high-speed data interface 30 via respective drivers 48 to 52.

The combined hardware and software of the decoder 3 enables the data in received channels to be decoded for display of viewer selected programmes and customer services. The scrambling is controlled on a continuous basis and the decoder can be updated with new descrambling codes as and when required. Data for customer services can also be supplied and updated substantially continuously and programmes relating to new services and applications can be down loaded into the decoder if so desired.

Remote Control Unit

Figure 4:
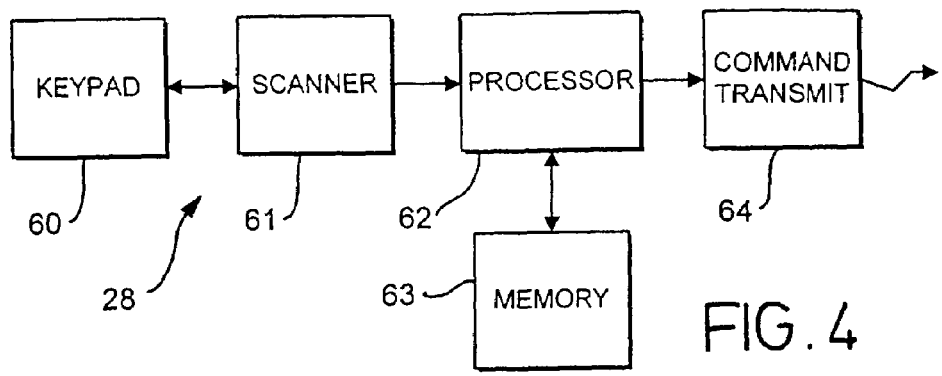
FIG. 4 is a schematic functional diagram of a remote control unit.

Turning now to FIG. 4 of the accompanying drawings, the remote control unit 28 comprises a keypad 60 which is scanned by a scanner 61. In response to manipulation of a key by the viewer, the scanner 61 outputs a code representing the viewer selected key to a processor 62. The processor 62 has associated with it a memory 63 containing programme data defining how the processor 62 should respond to codes from the scanner 61. The processor 62 is connected to control a command transmitter 64 including for example an infrared light emitting diode (not shown) for transmitting signals to the TV, the decoder 3 and the VCR 5 of the system shown in FIG. 1. Data defining the codes for transmission by the transmitter are stored in the memory 63. The memory 63 includes codes for the vast majority of televisions available in a given market (e.g. the UK market) and can therefore be said to be a "universal" remote control. Viewer selection of appropriate codes from the memory 63 can be made by any one of a large number of well known methods and therefore will not be described in further detail herein.

Figure 5:
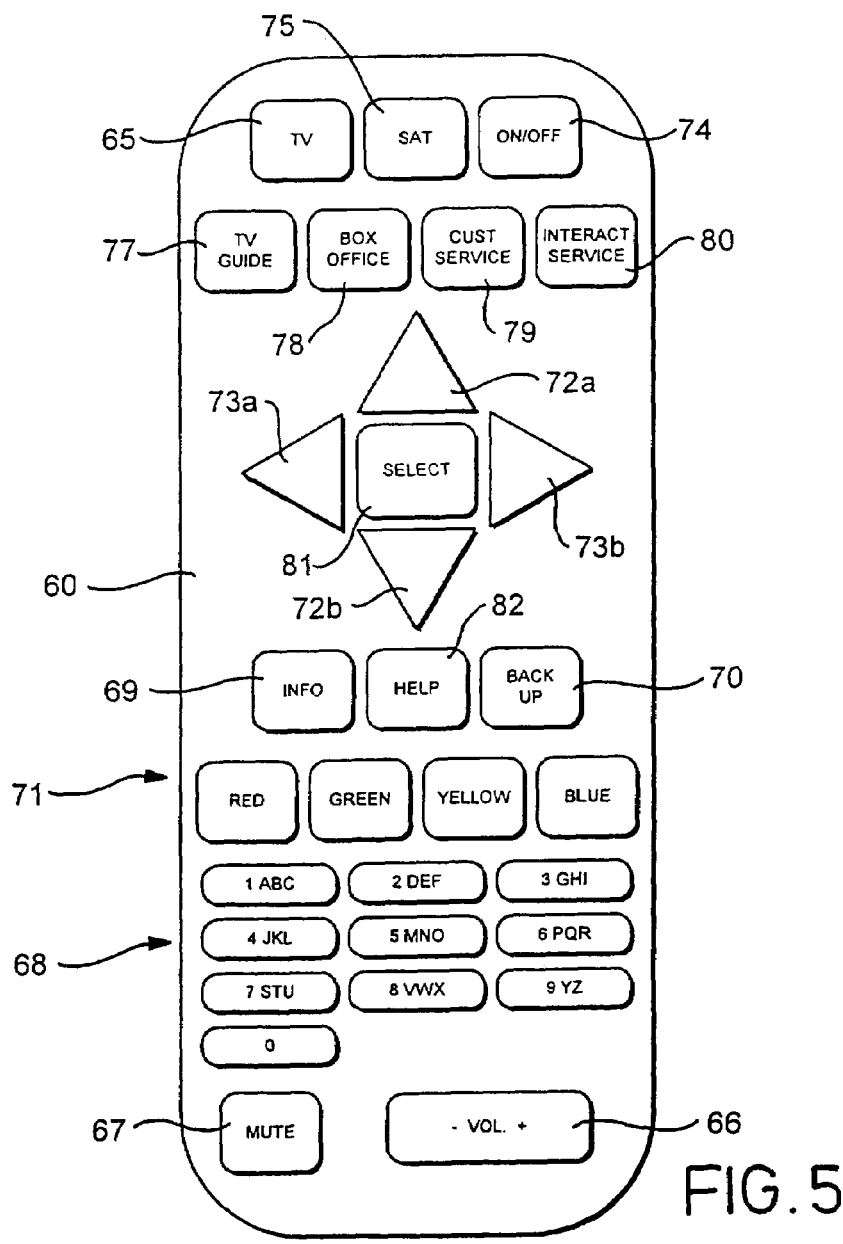
FIG. 5 is a schematic diagram of a keypad of the remote control unit.

The keys comprising the keypad 60 are shown in greater detail in FIG. 5 of the accompanying drawings. For the purpose of simplicity it will be assumed that control over the TV 2 and the decoder 3 only is required and that control over the VCR and other units is not required. It will, of course, be appreciated that the principles of operation of the remote control 28 in controlling the TV 2 and the decoder 3 can easily be extended to controlling also the VCR 5 and any other remotely controllable apparatus comprising the system 1.

The keypad 60 includes a TV key 65 which causes the remote control to function as a controller for the TV 1. When the TV key 65 is pressed the processor 62 responds by causing the transmitter 64 to transmit a command to the decoder to enter a standby mode in which signals are not transmitted via the SCART interface 20 (i.e. SCART pin 8 to the TV is set low). The transmitter also transmits a command to the TV 2 to select a predetermined channel, e.g. channel 1. Thus, the system 1 is controlled by the remote control unit 28 to operate in a television configuration in which the television receives terrestrial-based signals.

Once the command signals have been transmitted to the TV 2 and the decoder 3, the processor 62 in the remote control enters a mode corresponding to the television configuration of the system 1. In the television mode the remote control unit 28 responds to viewer operation of keys on the keypad 60 by transmitting command signals exclusively for the TV 2.

Most, if not all, of the functions of the TV controlled by the various keys of the keypad 60 shown in FIG. 5 should be self-apparent, but for the sake of completeness the following comments will be made. The audio volume is controlled by a volume control key 66 so-arranged that pressing the left-hand side thereof reduces the volume of sound output from the TV and pressing the right-hand side increases the volume. Pressing a mute key 67 causes the remote control unit 28 to transmit a command to mute the sound from the TV. A set of ten numeric keys 68 control TV channel selection.

A key 69 carrying the legend "INFO" causes the television to enter a teletext mode when first pressed (assuming the TV has a teletext facility). Depending on the make and model of the TV, further operation of the key 69 will cause the television to toggle between "TEXT", "MIX", and "TV" teletext modes. The teletext mode is exited by pressing a key with the legend "BACKUP" 70. A set of four coloured keys 71 (red, green, yellow and blue) enable so-called fast-text facilities to be utilised with the TV in teletext mode.

Pressing an upwardly pointing key (up key) 72a causes the TV to step up through the channels in the logical order in which they are tuned and pressing the downwardly pointing key (down key) 72b causes the TV to step down through the channels. The keypad also includes left and right keys 73a and 73b that serve no function when the remote control unit 28 is operating in the TV mode, but are used together with the up and down keys 72a, 72b to navigate around the IEPG when the system is in a satellite configuration.

The keypad includes an on/off key 74 for causing the TV to switch between an on mode and a standby mode. The keypad further comprises a "SAT" key 75, the selection of which causes the remote control unit 28 to transmit command signals to the system 1 causing it to operate in a satellite configuration. When the SAT key 75 is pressed the processor 62 responds by causing the transmitter 64 to transmit a command to the decoder 3 to enter a receive mode in which signals are received from the satellite dish 4, and received signals are decoded and transmitted via the SCART interface 20 to the TV 2. A command is also sent to the TV 2, if appropriate, so that TV receives signals transmitted by the SCART interface 20. If the TV 2 is not connected to the decoder 3 via a SCART lead, then the commands can be varied to ensure that the TV 2 instead receives signals via the UHF modulator 22. Thus the system 1 is controlled to operate in a satellite configuration in which the decoder 3 receives satellite-based signals which are decoded and output in appropriate form to the TV 2.

Once the command signals have been transmitted to the TV 2 and the decoder 3, the processor in the remote control enters a satellite mode corresponding to the satellite configuration of the system 1. In the satellite mode, the remote control unit 28 responds to viewer operation of keys on the keypad 60 by transmitting command signals both to the TV 2 and to the decoder 3 as appropriate.

Digital signals in the channels received via the satellite dish 4 contain programme schedule information which can be displayed under viewer control on the TV 2 when the system 1 is in the satellite configuration. That is to say, the decoder 3 can be controlled by way of the remote control unit 28 to operate as the intelligent electronic programme guide (IEPG) by causing the TV to display information relating to programme schedules, customer services and the like.

The remote control keypad 60 comprises a TV guide key 77, selection of which causes the decoder 3 to output for display a TV guide main menu or screen. Similarly, selecting a box office key 78, a customer service key 79 or an interactive service key 80 will cause the decoder to select an appropriate menu or screen for display to enable viewer interaction. The processor 62 is arranged to respond intelligently to the selection of any of the keys 77 to 80. If the system 1 (and therefore also the remote control 28) is in TV mode when any of the keys 77 to 80 are depressed, the processor 62 of the remote control responds by transmitting appropriate signals to the TV 2 and the decoder 3 to place the system 1 in the satellite configuration. The processor 62 then causes the remote control 28 to enter the satellite mode.

The remote control keypad 60 also includes a select key 81 provided to enable user interaction with IEPG screens displayed on the TV screen. The select key also enables interaction with other information displayed on the TV screen. A help key 82 causes the decoder to output for display help information. The processor 23 is arranged to respond intelligently by displaying help information appropriate to the IEPG screen displayed on the TV monitor when the help key 82 is selected. Selection of the info key 69 similarly causes the transmission of commands to the decoder causing the decoder processor 23 to output for display appropriate information depending on the IEPG menu displayed on the screen of the TV 2 when the info key 69 is selected.

When the remote control 28 is operating in the satellite mode, the processor 62 therein is arranged to respond to selection of any of the coloured keys 71 by transmitting so-called quick response commands to the decoder. The manner in which the decoder responds to the selection of the coloured keys 71 is software controlled and will vary between IEPG screens as will be described in greater detail hereinafter.

Decoder Functions

The decoder 3 provides several facilities based on information stored in the memory 25 to 27 of the decoder, information transmitted with video in television channels and information transmitted in dedicated IEPG channels. The facilities provided by the decoder will be described under separate headings as follows.

Surf, Search and Scan

It is envisaged that the data in each channel will be in compressed form, for example in accordance with the DVB/MPEG-2 standard. DVB allows both video data and other data to be combined in a single channel. In addition to the aforementioned operating data 43 (see FIG. 3) for use in controlling access to channels, the data in a channel can include brief programme scheduling data defining the scheduling of programmes in several of the channels as scheduling events.

One the scheduling data has been stored in the RAM the information relating thereto is available effectively instantaneously for display on the TV. The scheduling data is transmitted regularly (say every 10 seconds) so that the decoders are updated quickly after they are switched on. The information is brief (e.g. title of programme and its start and end times) and only covers a short period of time (e.g. 24 or 48 hours) to enable each channel to carry data for other channels provided by the same TV service company without excessive overheads in terms of bandwidth requirements in each channel and memory requirements in the decoder.

The decoder is arranged to enable a schedule of events for one channel to be displayed while displaying a television programme in another channel or to display a television programme in one channel while displaying a schedule of events for the one channel or another channel. These facilities (which will be referred to herein as "surf", "search" and "scan") allow the viewer to search through the programme scheduling information down-loaded from the received signals into the RAM 26 using the up and down keys 72a, 72b together with the left and right keys 73a, 73b on the remote control unit 28. The "surf" feature allows the viewer to change channels and to view for the current channel scheduling information for the present programme and for the next scheduled programme simply by pressing the up and down keys 72a, 72b on the remote control keypad 60. The "search" feature allows the viewer to move forward and backward in time through scheduling information for the current channel. Scheduling information for past programmes is deleted once the programme has finished. The "scan" feature is a combination of the "surf" and "search"
features and allows a viewer to view the video for the current channel while inspecting scheduling information for other channels.

The processor 23 of the decoder is arranged so that the surf mode is entered simply by the viewer pressing the up and down keys 72a, 72b. When one of the keys 72a, 72b is depressed the decoder responds by selecting another channel and thereafter outputting the video and audio for that channel to the TV 2. The processor adds information signals to the video signal so that the screen displayed on the TV 2 is similar to the screen shown in FIG. 6 of the accompanying drawings. The screen displayed on the TV comprises a programme portion 95 containing both the video for the selected channel and a channel identifier 96 and an information portion 97 containing information about the programme currently being received including its title and scheduling information and information about the next programme to be broadcast in the channel including its title and scheduling information. Other information such as the current time and instructions regarding the selection of programmes for other decoder features (e.g. the custom channel to be described in greater detail hereinafter) are also displayed in the information portion 97.

Figure 7:
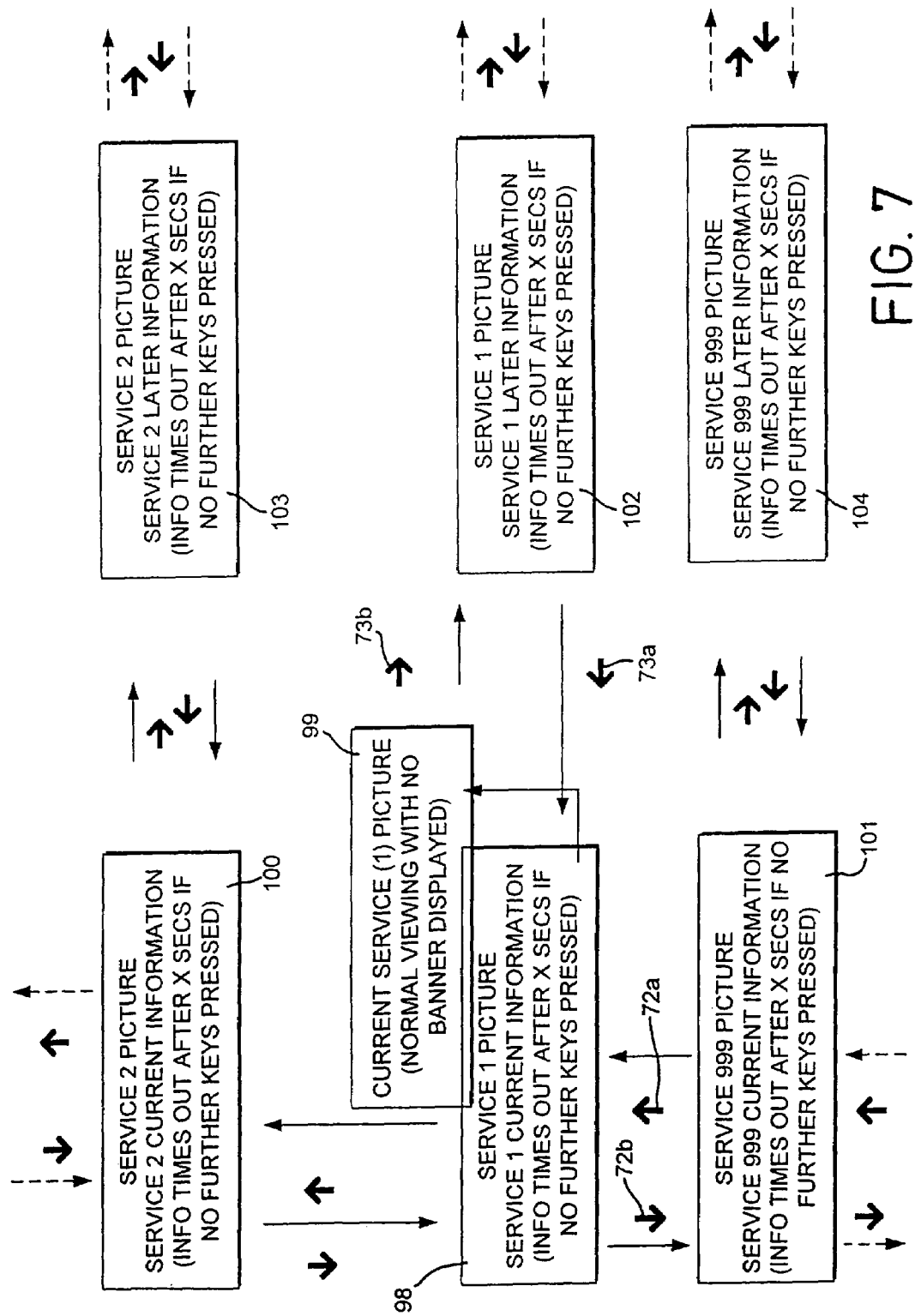
FIG. 7 is a flow diagram representing a "surf" function.

The surf feature and the search feature are shown in greater detail in FIG. 7 of the accompanying drawings. First the surf feature. When either of the up or down keys 72a, 72b are depressed the processor 23 causes the TV to display the current service picture (say service 1) and information relating to that service. This is represented by the box 98 in FIG. 7. If no further keys are pressed within the predetermined period, the processor removes the service information from the display as represented by box 99. If the up key 72a is depressed the processor is arranged to select the next logical service (i.e. service 2) and to cause the TV to display the picture therefore together with information relating thereto as represented by box 100. If the down arrow is instead depressed the processor will cause the TV to display the previous service picture together with information relating thereto as represented by box 101. It should be noted that in box 91 service number 999 has been identified. This assumes that the decoder is able to receive 999 different services. The logic of the decoder is such that when the lowest number service is displayed pressing the down button will cause the receiver to select for display the highest number service and vice versa. Movement between the boxes 98, 100, 101 and other boxes relating to other service numbers (not shown) is, of course, controlled by the up and down keys of the remote control 28. In the case of each box 98, 100, 101 the information portion for the service is removed so that only the picture is displayed if no further keys are selected on the remote control after a predetermined period of time, say ten seconds.

While the information is being displayed the viewer may use the search feature by selecting either the left or right key 73a, 73b. The right key is used to move forward in time, whereas the left key is used to travel backwards. Thus, for example starting at box 98, with service 1 picture and service 1 current information displayed on the TV screen selection of the right key 73b causes the information to change to later information for service 1 as represented by box 102. The viewer may return to the display represented by box 98 by pressing the left key 73a or may advance the scheduling information to even later information for service 1 by again pressing the right key 73b. Likewise, starting from box 100 the viewer can cause the later information for service 2 to be displayed with the picture for service 2, as represented by box 103, by pressing the right key 73b.

Similar movement through scheduling information for other services, e.g. service 999 as represented by boxes 101 and 104, is, of course, also possible.

Figure 8:
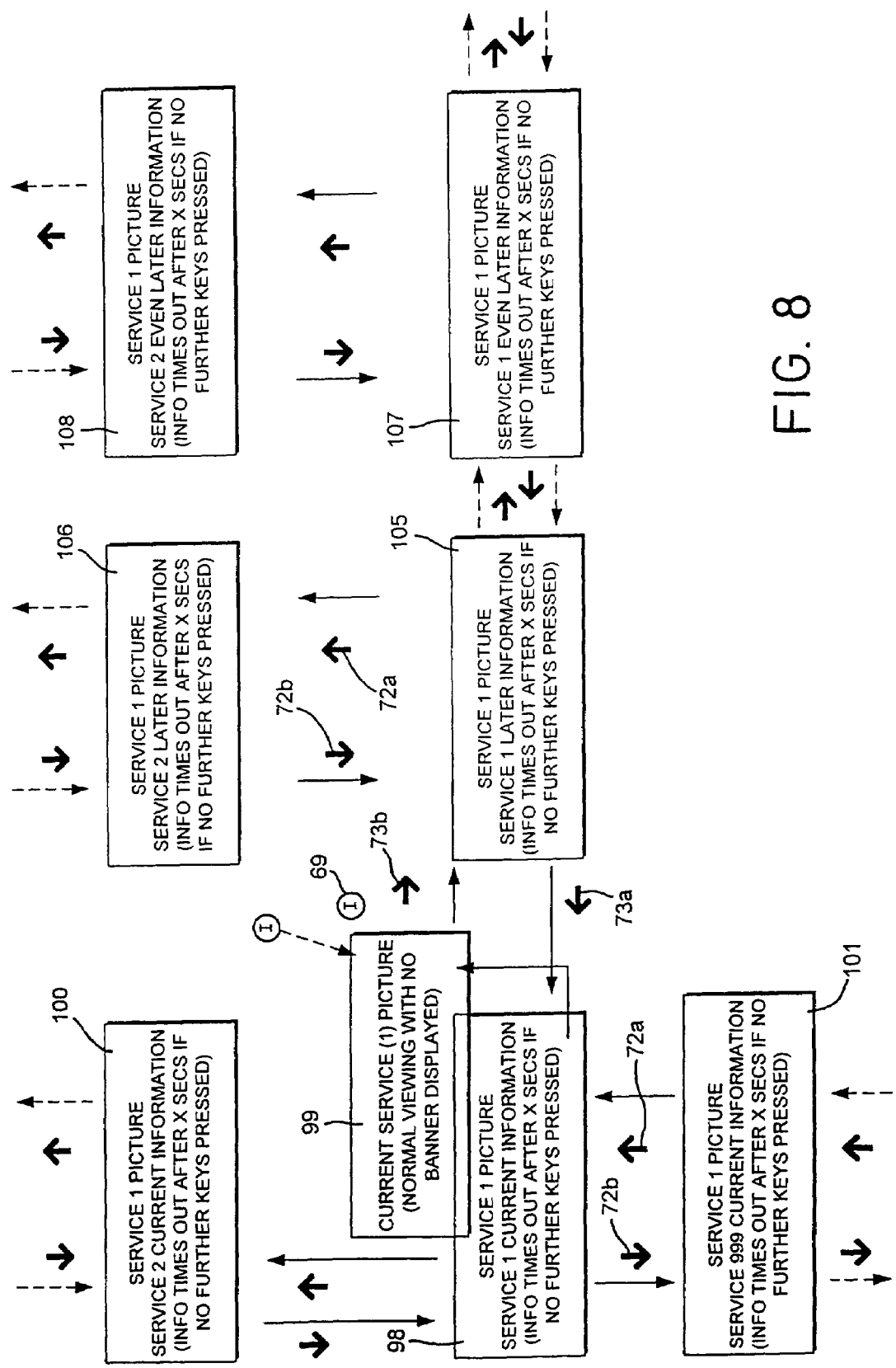
FIG. 8 is a flow diagram representing a "search" function.

FIG. 8 of the accompanying drawings shows the scan feature in greater detail. It will be noted that the left hand column of boxes correspond to the boxes 98 to 101 representing the surf feature in FIG. 7. Starting at box 98 with service 1 picture and service 1 current information displayed on the TV screen, selection of an appropriate key of the remote control unit, e.g. the information key 69 or another dedicated scan key (not shown). Selection of the information key 69 with the information shown in FIG. 6 displayed on the TV screen causes the processor to enter the scan function. An appropriate device representing the scan function may be displayed on the screen if so desired. Selecting the information key 69 again while in the scan function causes exit from the scan function to the normal TV screen represented by box 99.

While in the scan mode or function, selecting the left and right keys 73a, 73b changes the displayed information to earlier or later information for the service currently selected, whereas selecting the up and down keys 72a, 72b changes the service for which information is displayed. At all times in the scan mode the video for the service displayed when the scan mode was entered (i.e. service 1 picture) remains displayed on the TV screen.

Thus, for example, starting from box 98 and selecting the information key 69 followed by the right key 73b causes the TV to continue displaying the picture for service 1 and changes the information to information for service 1, as represented by box 105. From box 105, selecting the up key 72a causes the TV to display the picture for service 1 together with later information for service 2 as represented by the box 106. If the up key 72a is again depressed the information will change to later information for service 3 (not shown). If, however, starting from box 105 the right hand key 73b is depressed the information displayed will change to even later information for service 1 while the picture for service 1 will continue to be displayed, as represented by box 107. Starting from box 107 and selecting the up key 72a will result in the processor causing the TV to display service 2 even later information together with the service 1 picture as represented by box 108.

In other words, while in scan mode selection of the left and right keys causes the displayed information to move through time and selection of the up and down keys causes the displayed information to move through services. At all times the picture for the service received when the scan mode was entered (i.e. service 1) will remain displayed on the TV screen.

A similar logical flow can be developed from other starting points, e.g. box 100 or box 101. The scan mode can be entered from either the surf mode or the search mode by way of the information key 69. If a separate dedicated key is provided in the remote control keypad, the processor may be arranged to enter the scan mode directly without first entering the surf or search modes.

Intelligent Electronic Programme Guide (IEPG)

Figure 9:
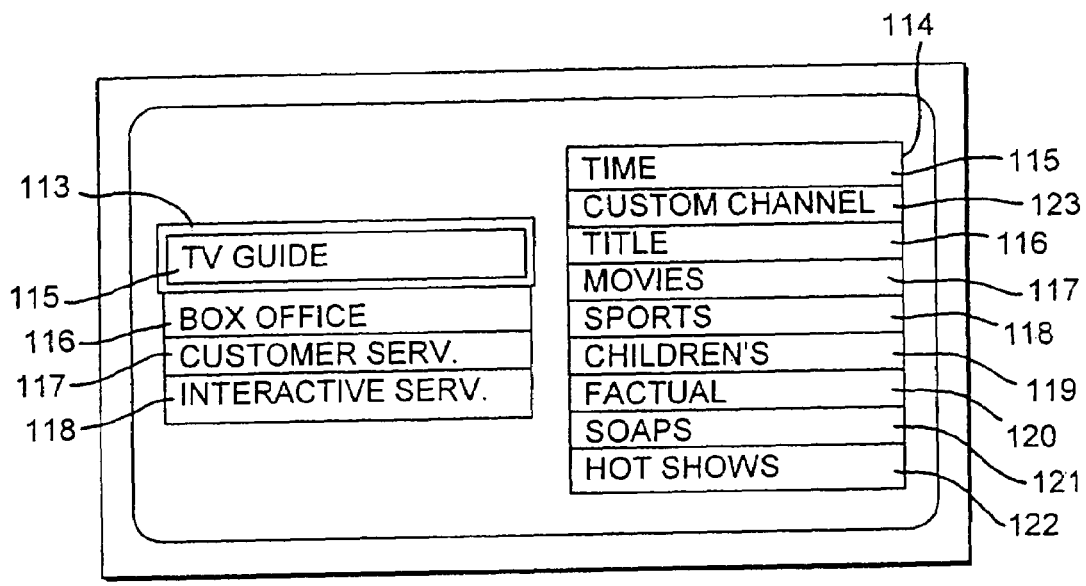
FIG. 9 is a schematic representation of an IEPG screen.

The processor 23 in the decoder is arranged to operate in an intelligent electronic programme guide (IEPG) mode in which information relating to programme listings, pay-per-view services, and other customer and interactive services is displayable on the screen of the TV 2. The decoder is arranged to enter the IEPG mode in response to selection of any one of the TV guide, Box Office, Customer Services or Interactive Services keys 77 to 80 of the remote control keypad 60. Selection of the TV guide key 77 causes the decoder initially to output data to the TV 2 representing an IEPG screen comprising two panels of options 113 and 114 as shown in FIG. 9 of the accompanying drawings. The left-hand panel 113 contains options corresponding to the keys 77 to 80 on the remote control keypad 60 and it will be noted that the box marked "TV Guide" 115 is highlighted as depicted by the double lines surrounding the "TV Guide" legend. In practice the box 115 would be highlighted for example by changing the shape and/or size of the box, increasing the brightness of the box, and/or changing the colour of the box. In the event that the viewer selected one of the other buttons 78 to 80, then the corresponding one of the other boxes 116 to 118 would instead be initially highlighted. The boxes 115 to 118 serve as a reminder to the viewer that these facilities are available for selection. The viewer can move between the boxes by manipulating the keys 77 to 80 on the keypad 60 or the up and down keys 72a, 72b.

The right-hand panel 114 identifies options available for the IEPG facility highlighted in the left hand panel 113. Thus, for example when the "TV Guide" box 115 is highlighted in the left hand panel, the right hand panel will identify the type of programme listings available in the TV guide.

TV Guide

Programmes can be listed by category, for example time 115, title 116, movies 117, sports 118, childrens 119, factual 120, soaps 121 or hot shows 122. Additionally, a listing of programmes entered into a custom channel 123 (to be described hereinbelow) can be displayed. With the TV guide selected, the viewer may scroll through the available options in the panel 114 by way of the up and down keys 72a, 72b of the remote control unit and may select a listing in a desired format by operation of the select key 81.

Figure 10:
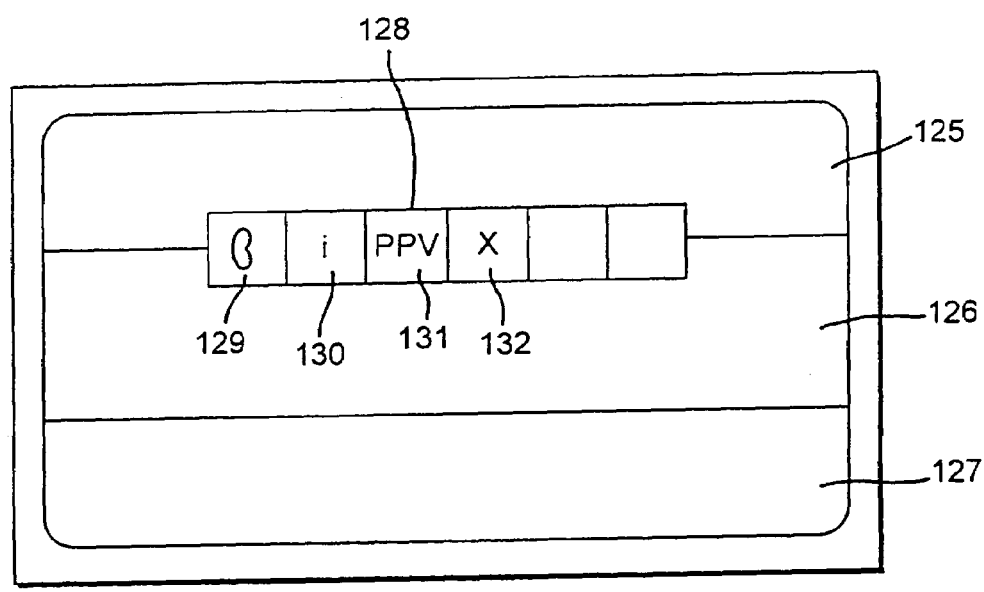
FIG. 10 is a schematic representation of a TV Guide screen.

When a listing in a desired format is selected, the processor 23 causes the display to be changed to the TV Guide screen shown in FIG. 10 of the accompanying drawings. The screen is divided into a top area 125, a grid area 126, and a lower area 127.

The top area of the TV Guide screen contains information such as a "TV Guide" logo in, say, the top left-hand corner and the current time in, say, the top right-hand corner. A legend indicating the format selected (e.g. "listings by time") is displayed in the centre of the top area and the name of the day to which the listings relate is displayed, say, at the right-hand edge of the top area. The top area 125 also contains an event icon box 128 which displays graphical icons 129 to 132 indicating whether or not an event has subtitles (an ear icon), additional information (an "I" icon), is a pay-per-view event, is subject to parental or other restriction, and so on.

The grid area 126 contains several entries of the selected listing. Entries can be scrolled by way of the up and down keys 72a, 72b of the remote control 28. The IEPG is arranged so that at any given time a selected one of the entries displayed in the grid area 126 is highlighted and the icons in the event icon box 128 relate to the highlighted entry.

The lower area 127 of the screen displays functions associated with the colour keys 71 of the remote control. The functions performed in responses to selection of the colour keys is determined by the IEPG software and will therefore vary between different IEPG screens. For example, if the currently displayed listing is "time" the IEPG may be arranged to respond to selection of the red key by changing the screen to the "title" listing, and to respond to viewer selection of the green key by changing the display to the "movies" listing.

When the "time" listing is selected the IEPG enables the viewer to access seven days of listings for all channels. When the "title" listing is selected a list of events for the next 48 hours is displayed in alphabetical order. When the "movies" listing is selected a list of movie titles is displayed in alphabetical order. Similarly, when the "sports", "childrens", "factual" and "soaps" listings are selected appropriate lists of programme titles and other information are displayed in alphabetical order on the TV screen. When the "hot shows" listing is selected a list of programmes which have been selected by the marketing department of the television service company is displayed in alphabetical order on the screen. Such shows may include first screenings, special events and the like that the marketing departments wish to promote.

The programme information for the listings is carried in a separate IEPG channel and can therefore be quite detailed. The displayed listing will include information about the day on which the programme is being shown, the time at which it starts and the time at which it finishes.

Programme Mosaic

In addition to displaying lists of television programmes available on several channels the processor is arranged to display a mosaic of promotional video clips simultaneously on the screen of the TV 2. The high bandwidths made available using digital techniques make it both possible and cost effective to use a single channel as a promotional channels. It is envisaged that the promotional channel would only be accessible by way of the IEPG to enable viewers to inspect forthcoming promotions and to select for viewing programmes advertised in the IEPG promotional channel.

Figure 11:
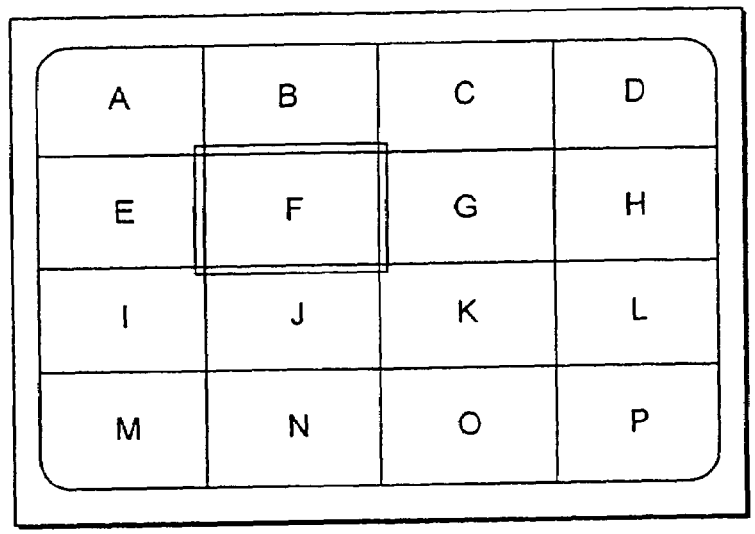
FIG. 11 is a schematic representation of a programme mosaic screen.

FIG. 11 of the accompanying drawings shows an example of a mosaic display comprising sixteen different promotional video clips running in a respective cell A to P. Each of the promotional video clips is of relatively short duration (say 2 to 3 minutes) and is run in a continuous cycle. The clips are combined in the mosaic form by the TV service company before transmission, and the whole mosaic is transmitted as video data representing a single picture in a single channel. Data identifying the events being promoted in each cell is transmitted with the video data for use by the processor 23 in the decoder. When the mosaic is first displayed one of the cells, e.g. cell F, is highlighted. The processor 23 is arranged to respond to viewer manipulation of the up and down, and left and right keys 72*a*, 72*b* and 73*a*, 73*b* of the remote control 28 by changing the highlighted cell. In this way, the viewer is able to navigate about the screen to enable a cell to be selected.

Figure 12:
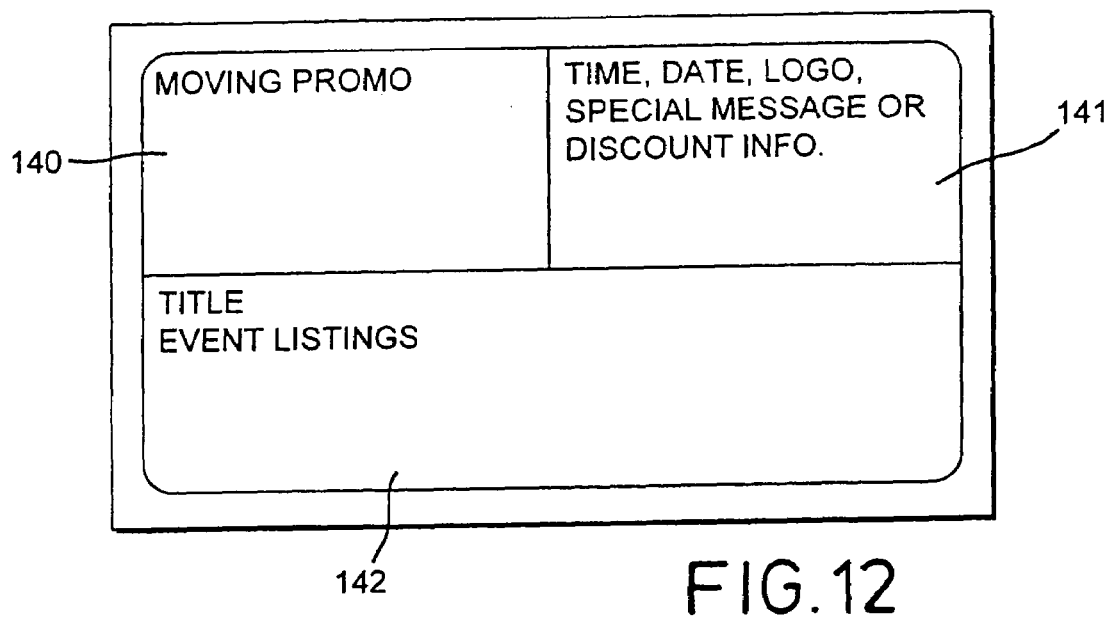
FIG. 12 is a schematic representation of a Box Office screen.

Cell selection is by way of the select key 81. The processor 23 is arranged to respond to manipulation of the select key for example in one of three ways. One way in which the processor 23 may respond is by tuning the receiver directly to the selected programme so that the viewer may view the programme immediately. Another way in which the processor 23 may respond is by adding details of the selected programme to the custom channel (to be described in greater detail hereinafter). Another way in which the processor may respond is by changing the display to the Box Office format shown in FIG. 12 of the accompanying drawings. That is to say, the processor 23 can be arranged so that the programme mosaic provides a route into the Box Office facility which will now be described.

Box Office (Pay-Per-View)

The Box Office facility may be accessed in several different ways. One way, as has already been mentioned herein, is for the viewer to select a cell from the promotional programme mosaic. Another way into the Box Office facility is for the viewer to select a pay-per-view programme from the TV guide.

The main route into the Box Office facility is via the IEPG initial screen shown in FIG. 9 of the accompanying drawings. With the IEPG initial screen displayed on the screen of the TV 2, viewer manipulation either of the box office key 78 or the up, down, left and right keys 72*a* and *b*, 73*a* and *b* together with select key 81 of the remote control unit 28 causes the processor 23 to output for display data in the Box Office format shown in FIG. 12. The format of the Box Office screen, and indeed the format of other screens described herein, is defined by the aforementioned template data. The template data may be predefined in memory or downloaded to the decoder in signals received via the satellite dish antenna 4.

The box office screen 139 is divided into three areas. The top left hand quadrant 140 contains a moving promotional video. In the interest of bandwidth economy it is preferred that the promotional video is derived from the promotional video in an IEPG mosaic channel. This is achieved by the processor 23 increasing the size of the video clip from the IEPG mosaic channel from 1/16 screen size to 1/4 screen size by way of pixel replication, interpolation, etc. Of course, a separate IEPG channel containing only four 1/4 size videos could instead be utilized with a suitable number of channels being employed to cover all desired pay-per-view events, although this is more wasteful of bandwidth. The top right hand quadrant 141 contains useful information such as the time and date and the television service logo.

As has previously been mentioned, each promotional video clip has associated with it data defining such information as the title of the programme and the time or times when the programme is to be broadcast. The processor uses the received information data together with the template data to generate a title and an event listing which are both displayed in the lower half 142 of the box office screen. Additional information such as special messages or discount information may also be associated with the promotional video clip. This additional information may be displayed in the right hand quadrant 141 or the lower half 142 of the box office screen, as desired.

In general the lower half 142 of the screen will display, in addition to the title and start time (including both time of day and day) of the next showing, information including at least some of the following. Some programmes, especially movies, are shown more than once. The additional information will include the frequency of showing if a programme is to be shown more than once. The rating of movies will also be shown. The price of viewing the programme will be shown in local currency. An "I" symbol will be displayed if an extended description of the programme is available. Finally, an ordering message such as "Press SELECT to order now" will be displayed in the lower half 142 of the Box Office screen.

As with previously described screens, the processor 23 is arranged to respond to manipulation of the up and down, and left and right keys of the remote control unit 28 by moving a highlight, or other suitable marker such as a cursor, around the Box Office screen.

In the event that the viewer presses the select key on the remote control unit 28, the processor 23 will respond by outputting for display data representing a box office ordering screen. The ordering screen is also displayed if the Box Office facility is entered either from the promotional mosaic or from the TV Guide. The purpose of the ordering screen is to enable the viewer to specify in detail the exact programme that he wishes to order. The ordering screen therefore includes such information as the title of the programme, the start time of the programme, or in the case of a movie the next showing of the movie, and the price of the programme. For movies additional information regarding the rating and the frequency of showing will also be shown. If a discount is to be made available for viewing at certain times that too will be shown. When there is more than one showing of a programme, legends will be displayed for the time of each showing and the viewer will be able to select the desired showing by way of the up, down, left and right keys 72a, 72b, 73a, 73b of the remote control unit 28.

The decoder may include a PIN (Personal Identification Number) facility to prevent unauthorised ordering of programmes, for example, or the ordering of adult rated movies by minors. If a PIN facility is included, the ordering screen will include a portion with which the viewer must interact to enter the PIN number via the remote control unit 28 before the order can be placed.

Once the viewer is satisfied with the order defined in the order screen displayed on the TV 2, the viewer may confirm the order by pressing the select key 81 of the remote control unit. The processor 23 is arranged to respond to the select command signal from the remote control unit by outputting data defining a confirmation screen for display on the TV 2. The confirmation screen contains the same information as the ordering screen together with a message such as "For Final Confirmation Press SELECT". If any time the viewer wishes to back out of an order or change an order to a different programme instead, pressing the back up key 70 will cause the processor 23 to return to displaying of the previous screen. The viewer pressing the select key 81 of the remote control unit causes the processor 23 to respond by entering an order placing routine.

If the decoder 3 is connected to a telephone line via the modem 7, the processor 23 will send data via the modem 7 to the TV service company placing the order for the viewer. The processor 23 is arranged to wait for confirmation that the order has been accepted, or otherwise, before controlling the modem to hang up. If the order has been accepted the processor will output a confirmatory message for display on the TV screen. If the order is not accepted the processor will instead output for display appropriate instructions to the viewer, such as "Please contact the TV service company".

Where the decoder does not include a modem or where connection cannot be made via the modem the processor will output for display suitable instructions to the viewer advising the viewer how to place the order by telephone.

The CD-ROM drive 25a can optionally be utilized in order to save bandwidth. Use of the CD-ROM drive 25a makes it possible for TV service companies to send some data direct to viewers via a compact disc (CD) for insertion into the CD-ROM drive 25a. The CD may contain template data and other similar data associated with the routine operation of the processor 23. The CD may also contain data defining a whole month (say) of listings for all services broadcast by the same company, and may even contain data defining the promotional video clips used in the mosaic display and the Box Office display. Non-changing information such as the title of a programme may be delivered to the customer with the video clip data on CD, and changing information such as future showing times may be included in the signals transmitted via satellite.

Alternatively, or additionally, the modem can be utilized in the transfer of data to viewers. A command signal may be transmitted via the satellite instructing the processor 23 to cause a message to be displayed immediately or when the decoder is next switched on. The message would instruct the viewer to connect the modem to a specified number at a specified time for the downloading of new data. Of course, the processor 23 can be arranged to bypass the viewer entirely by responding to a suitable command signal by causing the modem to connect to the specified number. The approach used to download new or updating data is simply a matter of viewer and service company preference.

Custom Channel

The information carried in each channel includes data for the processor 23 to enable the decoder 3 to be programmed to switch at appropriate times to events selected by the viewer. The processor 23 is therefore able to create under viewer control a so-called custom channel comprising a sequence of programmes or events selected in advance by the viewer from the displayed TV guide from the Mosaic or Box Office displays or by surfing and searching the brief scheduling information stored in RAM. In other words, the custom channel is a virtual channel programmed by the viewer in accordance with his or her planned viewing schedule.

Data defining the custom channel is held in a look up table in the RAM 26. When the viewer selects a programme by pressing the select button 81 of the remote control unit a prompt is displayed asking the viewer to confirm that the programme is to be entered onto the custom channel for future viewing. The viewer confirms the selection by pressing the select key 81 again.

Figure 6:
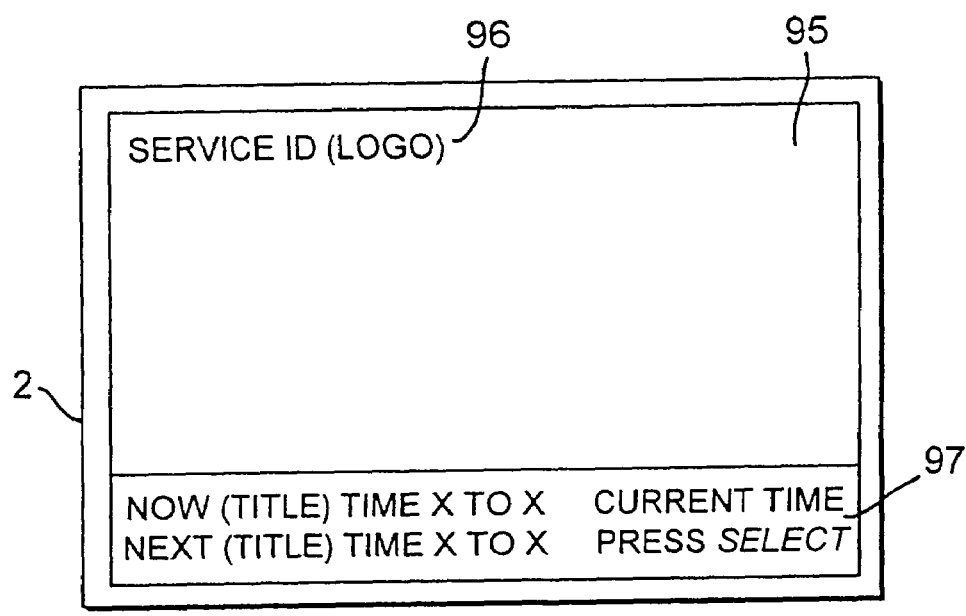
FIG. 6 is a schematic representation of a screen displayed when changing channels.

The titles and other details of programmes in the custom channel can be viewed at any time by selecting the "custom channel" option from the TV listings display shown in FIG. 6 of the accompanying drawings. Should there be a clash of programmes selected for the custom channel, the viewer is presented with a prompt screen identifying the clash and providing alternative options. The presentation of programme details on the custom channel is displayed a day at a time in time order. The processor 23 is arranged to respond to selection of the up and down keys 72a, 72b by moving through time on the day displayed and to respond to selection of the left and right keys 73a, 73b by changing the displayed information to previous or subsequent days.

If the custom channel has no events added to it by the viewer then it remains inactive. However, once events have been added to the custom channel by the viewer, operation of the decoder depends on the custom channel. The processor 23 is arranged so that when an event in the custom channel is one minute away from starting a prompt message is output for display on the TV screen reminding the viewer that the event previously selected is about to start. The prompt also asks the viewer for confirmation that he or she still wishes to tune to the event when it is scheduled to start. If the viewer presses the select key 81 of the remote control unit the decoder will remain tuned to the current service until the scheduled start time of the custom channel event, at which time the decoder will tune to that event. If the viewer presses the backup key 70 on the remote control, the prompt will be removed from the display and the decoder will remain tuned to the currently viewed service. The event will not, however, be removed from the custom channel listing. Consequently, should the viewer choose simply to extend the viewing of the currently viewed event, he can return to the preprogrammed event at a later time simply by entering the custom channel, for example via the TV guide listing screen shown in FIG. 6. If no key is pressed within a predetermined period of time, the prompt is removed from the display. All entries in the custom channel are automatically deleted from the RAM once the events have finished.

A programme may be related in some way to other programmes to be transmitted at different times and/or on different channels by the same TV service company. Obviously, programmes in daily or weekly serials are related to each other. Other relationships are less obvious. For example, a TV service company may wish to run a season of James Bond movies over a number of different channels with each movies being shown one or more times. Broadcasting in the digital domain makes it easy to include in the data for the showings of each movie further data linking that movie to other movies in the season. The processor 23 is arranged to respond to such linking data by displaying prompts when the viewer selects one movie for the custom channel. The prompts alert the viewer to other movies in the season and ask the viewer whether he/she wishes any of the other movies to be included in the custom channel. Interaction between the viewer and the IEPG then proceeds in a similar manner to that already discussed hereinabove to allow the viewer to add some or all of the linked programmes to the custom channel as desired.

Customer Services

The provision of a smart card enables every decoder to be uniquely identified. In view of the large data carrying capacity of compressed digital signals it is therefore possible for a TV service company to transmit personal messages to individual subscribers. In a conventional e-mail system receipt of a message depends on the destination being connected to a telephone line. Transmitting e-mail type messages to satellite decoders with smart cards does not suffer from this weakness. Unless a supply of power is physically removed from a decoder, the decoder will not normally be switched off. Decoders are designed to enter a stand-by mode when they are switched "off" by the viewer. In the standby mode a decoder can still receive signals via the satellite dish antenna.

When the user switches "off" the decoder 3, the processor 23 enters a stand-by mode in which the information data context of received signals is monitored for general updating control and programme scheduling data and also for message data specifically for the decoder 23 as determined by the identity data in the smart card 16a. In this way, a simple and inexpensive e-mail type message broadcasting system may be realised. The inclusion of the modem 32 within the decoder means that communication from the viewer back to the TV service company is also possible.

Interactive Services

The provision of the modem 32 within the decoder 3 also makes viewer interactive services possible. One application of this is to allow viewers to vote on the progress of a game show by pressing keys of the remote control unit 28. In the interactive mode the processor 23 is arranged to respond to signals from the remote control unit by transmitting appropriate data to a central polling station via the modem 32. Data representing instructions on how to interact with the game (i.e. which keys to press on the remote control unit) and commands to the processor 23 are transmitted as information data with the video data. The information data is decoded by the processor 23 which reacts as appropriate to the commands (i.e. connecting the modem to a telephone number if the viewer wishes to participate in the game) and also outputs the game instructions for display with the game programme on the screen of the TV 2.

The modem 32 also makes it possible for a viewer to interact with on-line services such as banking, insurance and mail order. It is envisaged that a channel similar to the above-discussed mosaic channel would carry promotional video and other promotional information for several companies offering an on-line service. The processor 23 can be arranged to enable the viewer to select a service from a service mosaic display screen in much the same way as programmes can be selected the promotional mosaic display screen shown in FIG. 11 of the drawings. Viewer selection of a service would result in the processor 23 establishing connection with the service via the modem 32.

It can take tens of seconds for a modem to establish connection. The processor is arranged to display the promotional video for the selected service together with additional information relating to the service on, say, a screen similar to the box office screen shown in FIG. 12 while the modem connection is being made. Such a display entertains the viewer while the modem connection is being established and is replaced with a more appropriate screen for interaction with the service once the connection has been made.

It will be appreciated by those possessed of the appropriate skills and knowledge that the invention is not limited to television signals transmitted via satellite or cable. The invention can be applied equally to any system for receiving digital television signals including the digital signal systems currently under investigation by terrestrial broadcasters in the UK and elsewhere.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

The invention claimed is:

1. A receiver for receiving digital television signals transmitted in a plurality of channels each comprising video data and information data the receiver comprising:
    a decoder for separating the information data and the video data and converting the video data on a selected channel into signals for output for a television;
    a store for storing information data;
    a viewer operable control device; and
    a processor connected to receive the information data from the decoder circuit and/or the store, the processor being arranged to:
        respond to viewer operation of the control device by processing selected information data to convert the same into signals representative thereof for output for a television in combination with the video signals, and
        vary both the selected channel and the selected information data in response to one said viewer operation of the control device, and to vary only the selected information data in response to a different said viewer operation of the control device.

2. A receiver as claimed in claim 1, wherein the information data is carried in each channel and comprises programme scheduling information for plural channels.

3. A receiver as claimed in claim 1, wherein the decoder and the processor are arranged to respond to said different viewer operation of the control device by varying the information represented by the output signals to correspond to scheduling information for programs in another channel different from the selected channel.

4. A receiver as claimed in claim 1, wherein the selected information comprises current scheduling information for programmes in the selected channel, and the processor is arranged to respond to said different operation by outputting signals representing scheduling information at a different time in the present channel.

5. A receiver as claimed in claim 3, wherein the selected information comprises current scheduling information for programmes in another channel different than the selected channel, and the processor is arranged to respond to said different operation by outputting signals representing scheduling information at a different time in the other channel.

6. A receiver as claimed in claim 1, wherein the information data comprises detailed programme scheduling information for plural channels, which scheduling information data is carried occasionally by each channel, and the decoder is arranged to store the detailed scheduling data in the store.

7. A receiver as claimed in claim 6, wherein the processor is arranged to respond to viewer operation of the control device by processing data from the store to derive therefrom signals representing selected detailed information in selected channels for output to a television.

8. A receiver as claimed in claim 7, wherein the processor is arranged to respond to viewer operation of the control device by storing, for a selected programme in the channels, viewing data to enable the programme to be viewed when video data therefore is transmitted in a channel at a scheduled time.

9. A receiver as claimed in claim 1, wherein one of the plurality of channels comprises video and information data for a plurality of video clips which video clips each represent a respective programme available or to be made available for viewing.

10. A receiver as claimed in claim 9, wherein the decoder is arranged to output signals representing the plural video clips for simultaneous display in respective portions of a television screen, and the processor is arranged to respond to viewer operation of the control device by storing for a selected video clip viewing data to enable the programme to which the selected clip relates to be viewed when video data therefore is transmitted in a channel at a scheduled time.

11. A receiver as claimed in claim 9, wherein the decoder is arranged to respond to viewer operation of the control device by outputting signals representing a selected one of the video clips for display on the television screen, and the processor is arranged to respond to said viewer operation by processing the information data and outputting signals representing scheduling information for the selected clip.

12. A receiver as claimed in claim 11, wherein the processor is arranged to respond to further viewer operation of the control device by storing viewing data to enable the programme represented by the clip to be viewed when video data therefore is transmitted in a channel at a scheduled time.

13. A receiver as claimed in claim 8, wherein the processor is arranged to store the viewing data in the store in such a manner as to enable custom channel data to be defined, the decoder and the processor being arranged to operate according to the custom channel data depending on viewer operation of the control device.

14. A receiver as claimed in of claim 1, further comprising a modem interface or a modem to enable the processor to transmit and receive signals via a telephone line, the processor being arranged to output signals to the modem for transmission depending on received information data and user operation of the control device.

15. A receiver as claimed in claim 1, further comprising an identifying device containing unique identity data to enable the receiver to be uniquely identified, and wherein the information data in the channels comprises message data for a receiver of a specified identity, and the processor is arranged to respond to the message data depending on the identity data in the identifying device by storing the message data in the store and converting the same into signals representing a message for output for a television.

16. A receiver as claimed in claim 1, wherein the information data comprises updating data which is transmitted occasionally for use by the processor.

17. A receiver as claimed in claim 1, further comprising a CD-ROM drive for reading a CD containing updating data for use by the processor.

18. A receiver as claimed in claim 16, wherein said updating data comprises data defining new applications to be executed by the processor.

19. A receiver as claimed in claim 16, wherein said updating data comprises template data for use by the processor in defining the format in which information is represented by the signals output for a television.

20. A receiver as claimed in claim 1, wherein the viewer operable control device comprises a remote control device.

21. A receiver as claimed in claim 1 connected to a television.

\* \* \* \* \*